(12) United States Patent
Abdoulin et al.

(10) Patent No.: US 8,395,517 B2
(45) Date of Patent: Mar. 12, 2013

(54) FILTER MONITORING DEVICE

(75) Inventors: Edgar Abdoulin, Woodland Hills, CA (US); Bernard S. Cohen, West Hills, CA (US)

(73) Assignee: Donaldson Company, Inc., Minneapolis, MN (US)

( * ) Notice: Subject to any disclaimer, the term of this patent is extended or adjusted under 35 U.S.C. 154(b) by 1044 days.

(21) Appl. No.: 12/380,731

(22) Filed: Mar. 3, 2009

(65) Prior Publication Data
US 2010/0225492 A1    Sep. 9, 2010

(51) Int. Cl.
G08B 21/00    (2006.01)

(52) U.S. Cl. .......................................... 340/626; 73/168

(58) Field of Classification Search .................. 340/626; 73/168, 714, 753; 324/712; 374/143; 702/86
See application file for complete search history.

(56) References Cited

U.S. PATENT DOCUMENTS

| | | | |
|---|---|---|---|
| 5,702,592 A | 12/1997 | Suri et al. | |
| 5,984,109 A | 11/1999 | Kanwar et al. | |
| 6,299,349 B1 * | 10/2001 | Steinel et al. | 374/143 |
| 6,784,669 B2 * | 8/2004 | Kison et al. | 324/712 |
| 6,904,788 B2 * | 6/2005 | Sandford et al. | 73/168 |
| 7,429,841 B2 | 9/2008 | Yunus et al. | |
| 7,444,252 B2 * | 10/2008 | Sihvola | 702/86 |

OTHER PUBLICATIONS

Manny Soltero, Jing Zhang, and Chris Cockrill; Texas Instruments; 422 and 485 Standards Overview and System Configurations; Application Report; SLLA070C—Jun. 2002.

An Application Guide for Op Amps; National Semiconductor Application Note 20, Feb. 1969; 2002 National Semiconductor Corporation AN006822.

Widlar, Robert J.; Monolithic Op Amp—The Universal Linear Component; National Semiconductor Application note 4, Apr. 1968; 2002 National Semiconductor Corporation AN007357.

* cited by examiner

Primary Examiner — John A Tweel, Jr.
(74) Attorney, Agent, or Firm — Pauly, DeVries Smith & Deffner L.L.C.

(57) ABSTRACT

A filter monitoring device which detects variances in pressure of fluid flowing through a filter element in a filter assembly includes (1) an indicator for conveying data of changes in the differential pressure of the fluid in the filter assembly and (2) a temperature sensor for transmitting data showing any changes in temperature of the fluid being filtered. A microcontroller converts data received about changes in differential pressure and temperature sensing means to digital format and transmits the data along two differential digital lines to a driver and output connector.

17 Claims, 8 Drawing Sheets

FILTER MONITORING DEVICE

BACKGROUND OF THE INVENTION

The present invention relates to an electronic apparatus for monitoring the differential pressure of a fluid across a filter element and the temperature of such fluid. In particular, the present invention relates to an apparatus that quickly, accurately and continuously measures differential pressure as it develops within a filtration system along with the temperature of the system.

The apparatus, by monitoring the differential pressure without coming into contact with the fluid in the system, has an increased useful sensor life. The apparatus also monitors temperature changes in the fluid to render the differential pressure monitoring functional at temperature extremes and to inform about the overheating of the filtration system.

The assignee of the present invention is the assignee of U.S. Pat. No. 5,702,592. The present invention is an improvement over the filter monitoring device disclosed in U.S. Pat. No. 5,702,592 which is incorporated herein by reference.

SUMMARY OF THE INVENTION

Many fluid systems, such as hydraulic transmissions and lubricating systems, have filter systems to remove particulate contaminates which are present in the circulating fluids. The contaminates in the fluid system may come from an internal or external source. These undesired contaminates affect the quality of the system performance since all moving components in contact with the fluid are damaged by wear from the contaminates flowing through the system. When the viscosity of the fluid is low the fluid flows easily; however, when the viscosity is high the fluid moves slower or flows with difficulty. The high viscous fluid requires a greater amount of power to move the fluid due to the higher resistance of the fluid to flow. The high fluid viscosity causes a pressure drop across valves and lines in the filtration system and in the fluid system itself. On the other hand, if a fluid has too low a viscosity, there is increased leakage across seals and excessive wear to the moving components in contact with the fluid when an oil or fluid film between the moving parts is interrupted or broken down.

The filter monitoring device of U.S. Pat. No. 5,702,592 provides a continuous monitoring of a pressure differential across a filter medium as the pressure differential changes within the filtration system. It continuously monitors the pressure differential within a filtration system and, and in certain embodiments, further monitors the temperature of the fluid within the filtration system.

The filter monitoring device of U.S. Pat. No. 5,702,592 senses and responds to any change in the differential pressure within the filter system.

The monitor of the present invention will hereinafter be referred to as "IFI," meaning Intelligent Filter Indicator. As is the case of the monitor of U.S. Pat. No. 5,702,592, the IFI is a non-intrusive sensor, measuring both the differential pressure across a filter element and the fluid temperature. The device uses a sensor piston containing a magnet. As the filter clogs, differential pressure across it increases causing the piston to move. As the magnet moves closer to a Hall Effect sensor, the sensor detects a change in flux density resulting in an increase in voltage/current output. To account for the effect of temperature changes, the circuitry incorporates a thermistor, which provides a voltage/current output based on changing resistance. Both pressure and temperature indicator outputs are calibrated and presented at the output connector as a DC signal ranging between 0.5 V and 10.5 V. The IFI includes state of the art electronics providing linear outputs corresponding to differential pressure and fluid temperature.

The IFI of the present invention transmits data in a form which complies with industry standard ANSI TIA/EIA-422 entitled Electrical Characteristics of Balanced Voltage Digital Interface Circuits published by the ANSI Telecommunication Industry Association/Electronic Industries Association (TIA/EIA) which is hereinafter referred to as "RS422" and is incorporated herein by reference.

A signal processor can read the voltage output and convert the data to a corrected or normalized signal as follows:

The corrected DPo at a given temp Ti is: $Dpo=Dpi (Uo/Ui)$

Where:

Dpi=actual differential pressure (psid) at temperature Ti

Dpo=standard reference differential pressure (psid) based on contaminant load at To.

Uo=absolute viscosity (centipoise) at standard temperature To

Ui=absolute viscosity (centipoise) at temperature Ti

Since viscosity is a known function of temperature {i.e. $Ui=f(Ti)$}, it can be represented by an equation or tabulated in a data base for small increments of temperature. This establishes a method of interpreting the "thermal lockout' condition. Therefore, the corrected output signal Dpo in VDC (by virtue of a microprocessor) is not biased by low temperature fluid viscosity effects and will reflect the percent life remaining in the filter element based on contaminant capacity only. The IFI of the present invention has a differential pressure range of 0 to 150 psid and a temperature range of −55° C. to +150° C.; however, this could vary between specific models and sizes of IFI devices.

The IFI of the present invention with its digital output has numerous advantages over the filter monitoring device of U.S. Pat. No. 5,702,592 which utilized an analog output. These include the following: it provides for direct conversion of output voltage to temperature resulting in higher accuracy; it allows for operation in noisy environments and over long cable lengths both for the pressure differential output and the temperature output; it allows for easy conversion from voltage to actual differential pressure values in contrast to the prior art differential pressure voltage output and temperature voltage output which were non-linear and required tables for conversion. Additionally, the power consumption is much lower for the IFI, namely, 50 mAdc(maximum) as compared with the analog device of U.S. Pat. No. 5,702,592 which utilizes power up to 100 mAdc. The transmission rate of the IFI is software controlled and can be changed to accommodate various applications.

It is an object of the present invention to provide a fluid monitoring device to monitor fluid pressure and temperature and changes therein on a non-intrusive basis and provide linear outputs corresponding to differential pressure and fluid temperature.

Other objects and advantages of the present invention will become apparent to those skilled in the art upon a review of the following detailed description of the preferred embodiments and the accompanying drawings.

IN THE DRAWINGS

DETAILED DESCRIPTION OF THE INVENTION

Figure 1:
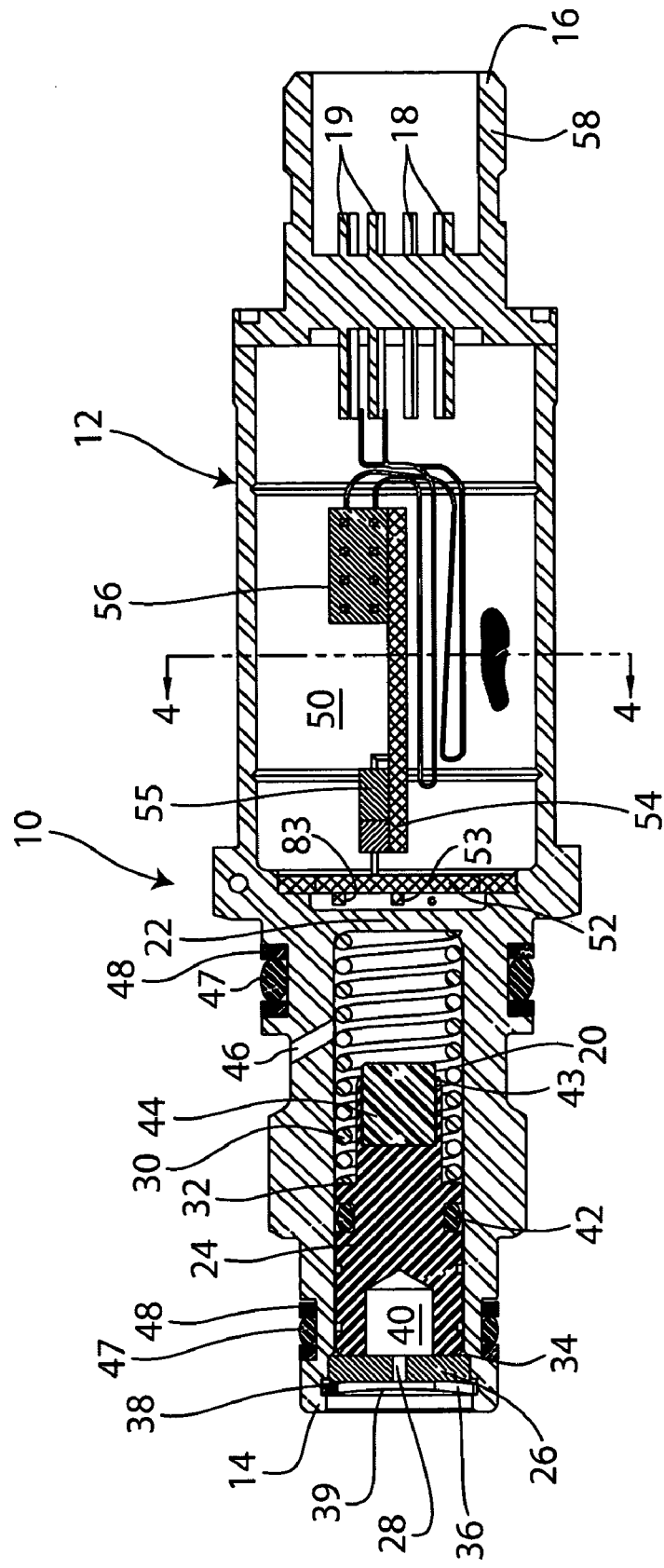
FIG. 1 is a sectional view of the IFI monitor device.
Figure 4:
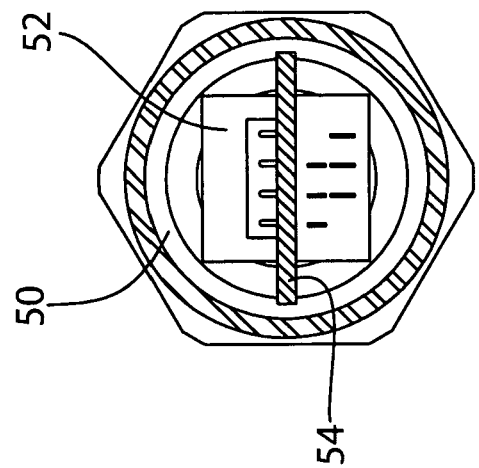
FIG. 4 is a sectional view taken through line 4-4 of FIG. 1.
Figure 3:
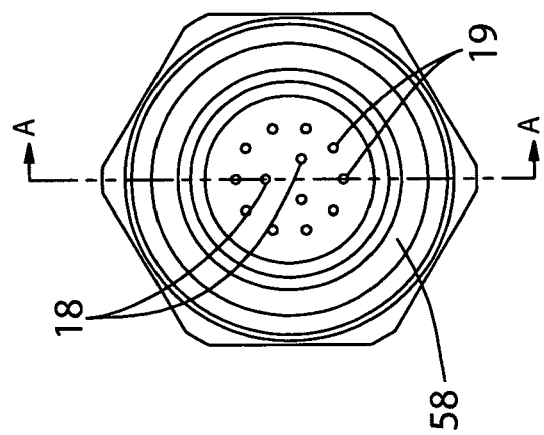
FIG. 3 is an end view of the electrical connector at the right end of FIG. 1.
Figure 2:
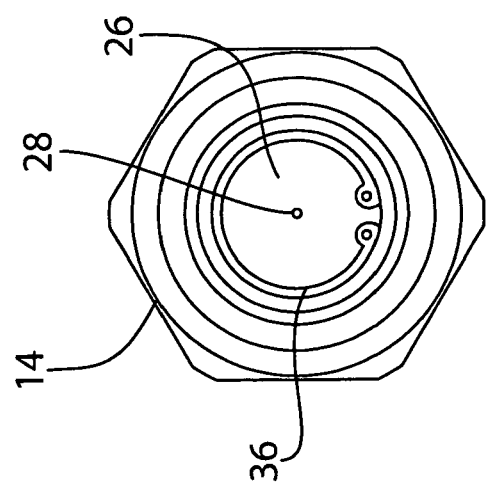
FIG. 2 is an end view taken from the inlet end on the left of FIG. 1.

Referring to FIGS. 1-4 there is shown the IFI monitoring component 10 of the present invention which includes a housing 12 extending from a first end 14 to a second end 16 which defines an electrical connector 58 having a plurality of engagement pins 18, 19. The housing 12 has a first interior chamber 20 extending from the first end 14, which is open, to a transversely extending wall 22. Positioned in the first interior chamber 20 is a piston assembly 24 which is axially movable in the first chamber 20 in response to fluid pressure exerted upon it. The piston assembly 24 is retained in the first chamber 20 by a fitting 26 having a central high pressure sensing port 28 lying on the axis of the first chamber 20. A compression spring 30 has one end bottomed against the transverse wall 22 and the opposing end engaging a radial shoulder 32 of the piston assembly 24. The spring 30 yieldingly urges the piston assembly 24 toward the fitting 26.

The fitting 26 is held in a fixed position on the housing by virtue of engagement with an internal step 34 of the housing 12 on its side facing the piston assembly 24 and engagement by a retaining ring 36 on the opposing side. The retaining ring 36 is snapped into an inwardly facing groove 38 and has a concavity 39 facing the first end 14.

The piston assembly 24 has an internal cavity 40 at its end adjacent the fitting 26, such cavity 40 being in communication with the high pressure inlet sensing port 28. A first-O ring 42 is positioned in an inwardly facing annular groove of the piston assembly 24 and prevents fluidized pressure which has been introduced through the high pressure sensing port 28 to the cavity 40 from escaping.

The leading end of the piston assembly 24 has a reduced diameter extending from a position forwardly of the radial shoulder 32 to its forward-most end 43 facing the transverse wall 22. Such reduced diameter portion is sized to fit in the opening defined by the compression spring 30. That portion of the piston assembly 24 extending rearwardly from the forward-most end 43 has a hollowed out section in which it is positioned a magnet 44. High pressure fluid introduced through the sensing port 28 enters the cavity 40 and drives the piston assembly 24 and the magnet 44 carried thereby toward the transverse wall 22 and toward electronic assembly mounted on the opposite side of the transverse wall 22 therefrom.

The housing 12 is also provided with a low pressure sensing port 46 in the area of the housing between the transverse wall 22 and the radial shoulder 32 of the piston assembly 24. The housing 12 also has outwardly facing O-rings 47 and retaining rings 48, one set of which is slightly spaced from the first end 14 and the other set of which is on the opposite side of the low sensing port 46 in the area of the transverse wall 22.

Forwardly of the transverse wall 22 the housing 12 becomes enlarged and defines a second chamber 50 in which is positioned a sensor board 52 having (1) a magnetic position sensor 53 for detecting the Hall effect resulting from movement of the magnet 44 toward or away therefrom in response to high pressure introduced to the cavity 40 through the high pressure sensing port 28 and (2) a temperature sensor 83. The sensing board 52 is spaced a short distance (on the order of two millimeters) from the transverse wall 22. Potting compound is positioned in the space.

Figure 6:
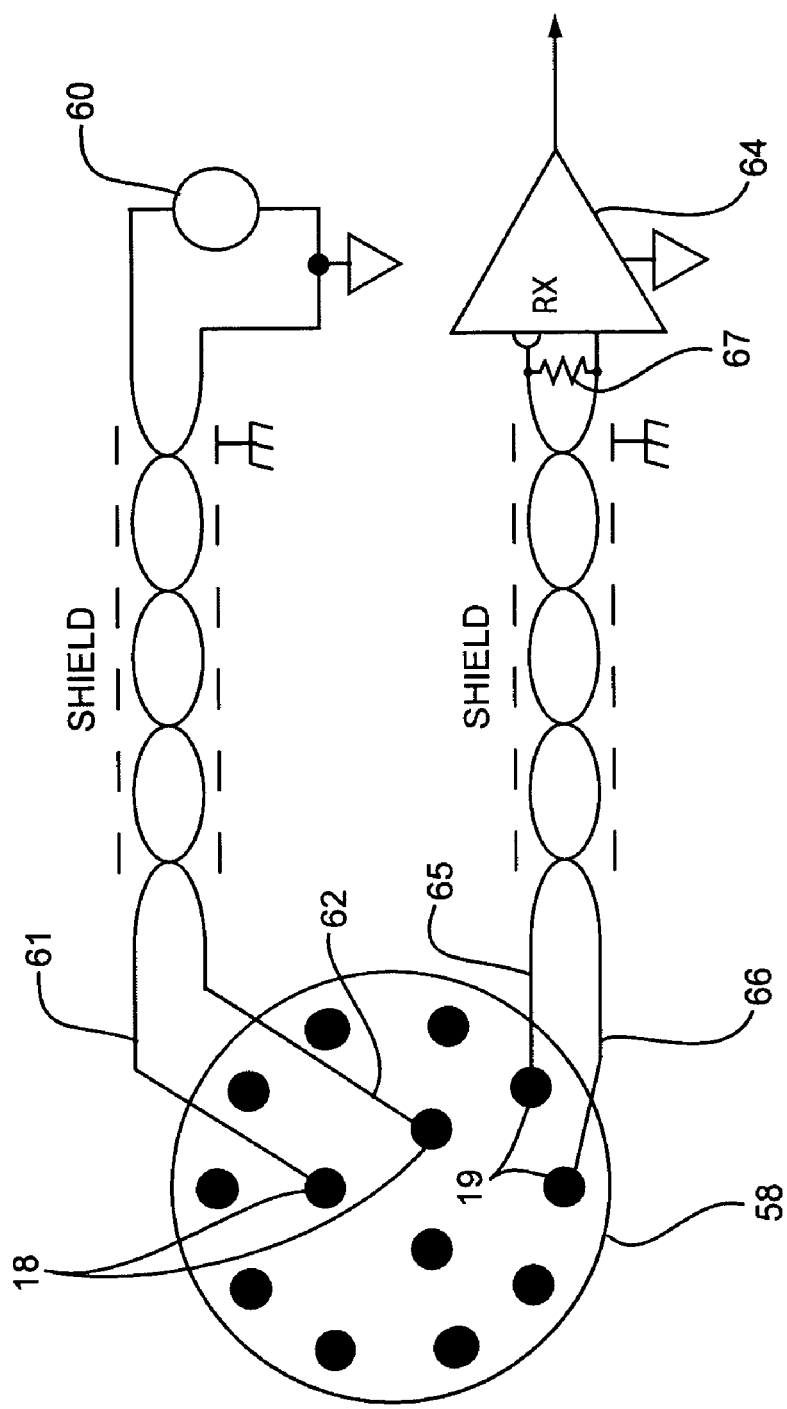
FIG. 6 is a wiring diagram showing input to and output from the electrical connector.

Signals from the sensor board 52 are transmitted through an electronic assembly 54, to a control board assembly 56 and then to an electrical connector assembly 58 adapted to plug into an element not shown) for transmitting data via pins 19 to an external monitor 64 such as a computer or other receiver and to receive power from a source of power by means of pins 18 (see FIG. 6). The control board assembly 56 includes a microcontroller. Following assembly of the above components and the wiring therefore, the remainder of the second chamber 50 is filled with potting compound to rigidify the positions of the components mounted in the chamber 50 and prevent damage from shocks or impacts. Additionally, the second chamber 50, is hermetically sealed.

Figure 5:
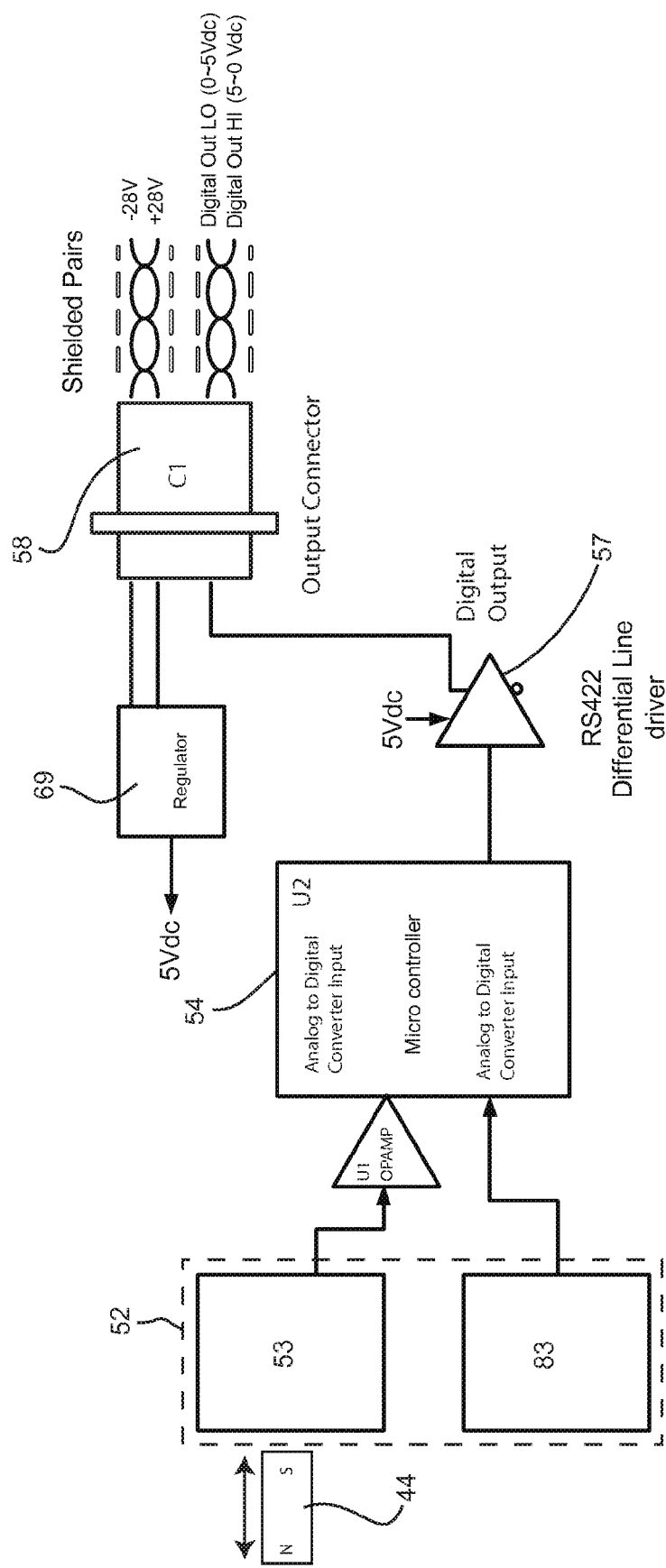
FIG. 5 is a block diagram of the IFI monitor.

Referring to FIG. 5 there is shown a block diagram of the IFI monitor component 10. The block diagram of FIG. 5 shows the magnet 44 moving toward and away from the Hall effect sensor 53. located on the sensor board 52. Signals from the Hall effect sensor are delivered to an operational amplifier U1 and then to an analog to digital converter of the microcontroller of electronic assembly 54. The temperature sensor 83 also sends an output in analog form to the electronic assembly 54 and its microcontroller which converts such data from analog to digital. The microcontroller transmits the digital data to the board assembly 56 in a format that is consistent with the requirements of RS422. The board assembly 56 includes a differential line driver 57 which delivers data in compliance with RS422 to the output connector 58 for transmission to the external monitor 64 as shown in FIG. 6.

Referring to FIG. 6 there is shown a wiring diagram for power into the IFI monitor component 10 and the transmission of data therefrom. The data being transmitted therefrom is in a format consistent with the requirements of RS422. Power from a power source 60 is transmitted through a pair of shielded wires 61, 62 at +28 Vdc and −28 Vdc to pins 18. The external power source could be in the range of 18 to 32 Vdc. Another pair of pins 19 provide an outlet connection for delivering data consistent with the requirements of RS422 to an external monitor 64. One of the pins 19 delivers the high level digital output (5-0 Vdc) through wire 65 to the external monitor 64 and the other pin 19 delivers the low level digital output (0-5 Vdc) through wire 66 to the external monitor 64. The wire 65 is hereinafter designated as the HI signal wire and the wire 66 is hereinafter designated as the LO signal wire. Shielding is provided for both the HI signal wire 65 and the LO signal wire 66.

Figure 7:
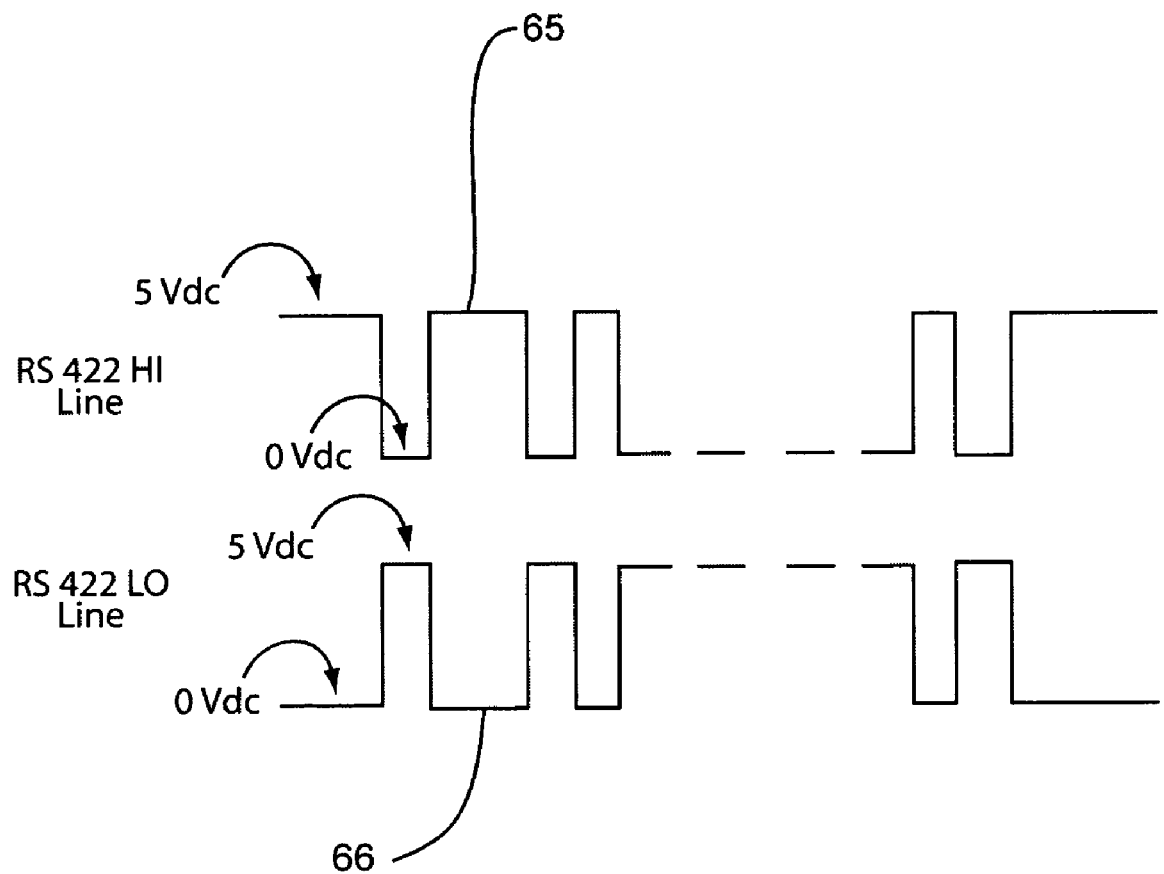
FIG. 7 is a schematic view showing the relationship of HI and LO signals transmitted through two signal wires.

As previously mentioned the digital output of the IFI monitoring component 10 conforms to RS422 standard. This standard requires a point to point connection between the IFI component 10 and the external monitor 64 via two wires, namely, the HI signal wire 65 and the LO signal wire 66. The signal transmitted by each of the wires 65, 66 swings between 0 Vdc and 5 Vdc. The HI and the LO signals transmitted by the HI signal wire 65 and the LO signal wire 66 are mirror images of one another (See FIG. 7). When HI signal is 5 Vdc, the LO signal is 0 Vdc and visa-versa (Differential signals).

The differential signal method was chosen to minimize noise effects of the environment and provide long transmission lines to be employed. In order to operate properly, the RS422 output of the IFI monitor component 10 must have a termination resistor 67 with a rated minimum of 120 Ohm positioned between the IFI monitor component 10 and the external monitor 64 (See FIG. 6). The external monitoring apparatus 64 will convert this differential signal to a single ended one swinging between 0 and 5 Vdc. The IFI monitor component 10 does not read or accept any transmissions from the external monitor 64.

Figure 8:
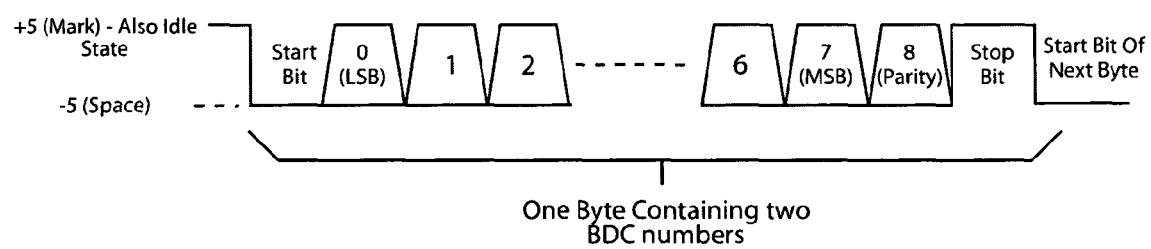
FIG. 8 is a schematic view showing digital output.

FIG. 8 show the transmission protocol for the IFI monitor component 10.

The data sent on the HI and LO signals via wires 65 and 66 (FIG. 7) comprises of 4 bytes (8 bits each) representing the temperature and differential pressure as measured by the IFI monitor component 10. Each byte in a frame contains two BCD (Binary Coded Decimal).

The IFI monitor component 10 sends 4 bytes of data every one second (a frame of four bytes)—each byte is preceded with a START Bit and ends with a STOP Bit to allow the external monitor 64 to begin decoding the data sent from the IFI monitor component 10. A PARITY bit is also sent prior to the STOP bit. The external monitor 64 can check this PARITY bit to determine if a valid byte has been received or not. The PARITY bit is set to "1" if the total number of "1"s in the transmitted byte is ODD and set to "0" if the total number of "1"s in the transmitted byte is EVEN. This is defined as ODD Parity. The byte transfer rate for the RS422 output of the IFI monitor component 10 is set to a fixed 9600 bits per second (Baud).

Decoding the Output of the IFI monitor component 10 is set forth as follows in Table I. Each byte in a frame contains two BCD numbers (Binary coded Decimal)—each BCD number consists of four bits. These four bits digitally represent a numerical value between 0 and 9. Table 1 shows the various numbers associated with each 4 bit patterns:

TABLE I

| BIT Pattern | Corresponding BCD number |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |

The IFI monitor 10 sends 8 BCD numbers in each packet. These numbers are designated as follows:

8 BCD numbers received represent Temperature and Differential Pressure as measured by the IFI Monitor 10.
4 BCD numbers for temperature are transmitted first and 4 BCD numbers for pressure are transmitted next.
Frame Transfer Sequence
   $1^{st}$ transmitted byte contains:
      BCD number for $1^{st}$ digit (LSD) of temperature in bits 3 (MSB) to 0 (LSB)
      BCD number for $2^{nd}$ digit of temperature, in bits 7 (MSB) to 4 (LSB)
   $2^{nd}$ transmitted byte contains:
      BCD number for $3^{rd}$ digit of temperature in bits 3 (MSB) to 0 (LSB)
      BCD number for $4^{th}$ digit (MSD) of temperature, in bits 7 (MSB) to 4 (LSB)
   $3^{rd}$ transmitted byte contains:
      BCD number for 1st digit (LSD) of pressure, in bits 3 (MSB) to 0 (LSB)
      BCD number for 2nd digit of pressure, in bits 7 (MSB) to 4 (LSB)
   $4^{th}$ transmitted byte contains:
      BCD number for 3rd digit of pressure, in bits 3 (MSB) to 0 (LSB)
      BCD number for 4th digit (MSD) of pressure, in Bits 7 (MSB) to 4 (LSB)

Decoding the output of the IFI monitor component 10 is accomplished in two steps:

Decoding-Step one: Assemble the BCD numbers, convert to numeric format, and divide the result by 100:

For example if the received BCD numbers for the temperature channel, in the order received, are
   Two BCD numbers in byte 1 of temperature data: 59
   Two BCD numbers in byte 2 of temperature data: 06
   Combine byte 2 with byte 1, yielding 0659. Convert to numeric format, then divide by 100 resulting in 6.59 (numeric value).

The same applies to the pressure channel. If the received BCD numbers are
   Two BCD numbers in byte 1 of pressure data: 3.7
   Two BCD numbers in byte 2 of pressure data: 10
   Combine byte 2 with byte 1, yielding 1037. Convert to numeric format, then divide by 100 to obtain 10.37 (numeric value).

Decoding, Step 2:

Calculate actual pressure and temperature values:

For the pressure channel, the IFI monitor component 10 sends a numeric value between 0.5 and 10.5 (when decoded).

The actual pressure (In PSID) can be calculated from the following formula:

$$dP = (dPVdc - 0.5) * 15$$

Where dPVdc is the numeric value obtained by decoding the Pressure channel bytes.

For the temperature channel, the IFI monitor component 10 also sends a numeric value between 0.5 and 10.5 (when decoded). The actual temperature (In degrees Celsius) can then be calculated from the following formula $$T = (TVdc - 400/165 - 0.5) * 16.5$$

Where TVdc is the numeric value obtained by decoding the temperature channel bytes.

A Complete Example:

The information shown is the external monitor's 64 memory content after receiving one frame from the IFI monitor 10:

| | MSB | LSB | Parsed | | BCD Equivalent (Bytes Decoded) |
|---|---|---|---|---|---|
| $1^{st}$ byte | 0 1 0 1 1 0 0 1 → | | 0 1 0 1 | 1 0 0 1 → | 5 9 |
| $2^{nd}$ byte | 0 0 0 0 0 1 1 0 → | | 0 0 0 0 | 0 1 1 0 → | 0 6 → 0659 → 6.59 V (Temp) (Divide by 100 to obtain Temp value) |
| 3rd byte | 0 0 1 1 0 1 1 1 → | | 0 0 1 1 | 0 1 1 1 → | 3 7 |
| $4^{th}$ byte | 0 0 0 1 0 0 0 0 → | | 0 0 0 1 | 0 0 0 0 → | 1 0 → 1037 → 10.37 V (dP) (Divide by 100 to obtain Pressue Value) |

To Calculate Use: T = (TVdc − 400/165 − 0.5) * 16.5
T = (6.59 − 400/165 − 0.5) * 16.5 = 60.48° C.
To Calculate Use: dP = (dPVdc − 0.5) * 15
dP = (10.37 − 0.5) * 15 = 148 PSID Transmission Under Normal and Abnormal Conditions:

Under normal operating conditions:

The IFI monitor will transmit the numeric value of 0.50 for each channel that is at its MINIMUM:

If dP=0 PSID, then transmitted pressure bytes are 0050

If T≦−40° C., then transmitted temperature bytes are 0050

The IFI monitor 10 will transmit the numeric value of 10.50 for each channel that is at its MAXIMUM:

If dP≧150 PSID, then transmitted pressure bytes are 1050

If T≧125° C., then transmitted temperature bytes are 1050

Under abnormal conditions the IFI monitor component 10 will transmit the proper error codes depicted in Table 2.

TABLE 2

IFI Transmitted Error Codes

| Possible Abnormal Condition | Transmitted Temp bytes (TTTT) | Transmitted Pressure Bytes (PPPP) | Comment |
|---|---|---|---|
| Magnetic sensor output stuck low, Temperature sensor OK | Normal BCD numbers between 0 and 9 | AAAA (Hex) | Bit stream for PPPP (all four bytes) 1010101010101010 Corresponding to HEX "AAAA" |
| Magnetic sensor output stuck high, Temperature channel OK | Normal BCD Numbers between 0 and 9 | BBBB (HEX) | Bit stream for PPPP (all four bytes) 1011101110111011 Corresponding to HEX "BBBB" |
| Temperature sensor output stuck low, Magnetic sensor OK | AAAA (HEX) | Normal BCD numbers between 0 and 9 | Bit stream for TTTT (all four bytes) 1010101010101010 Corresponding to HEX "AAAA" |
| Temperature sensor output stuck high, Magnetic sensor OK | BBBB(HEX) | Normal BCD numbers between 0 and 9 | Bit stream for TTTT1011101110111011 Corresponding to HEX "BBBB" |
| Both Temperature and Magnetic sensor abnormal | AAAA (HEX) or BBBB (HEX) | AAAA (HEX) or BBBB (HEX) | Bit stream for each channel same as above. |

Differential Pressure Measurements

Figure 11:
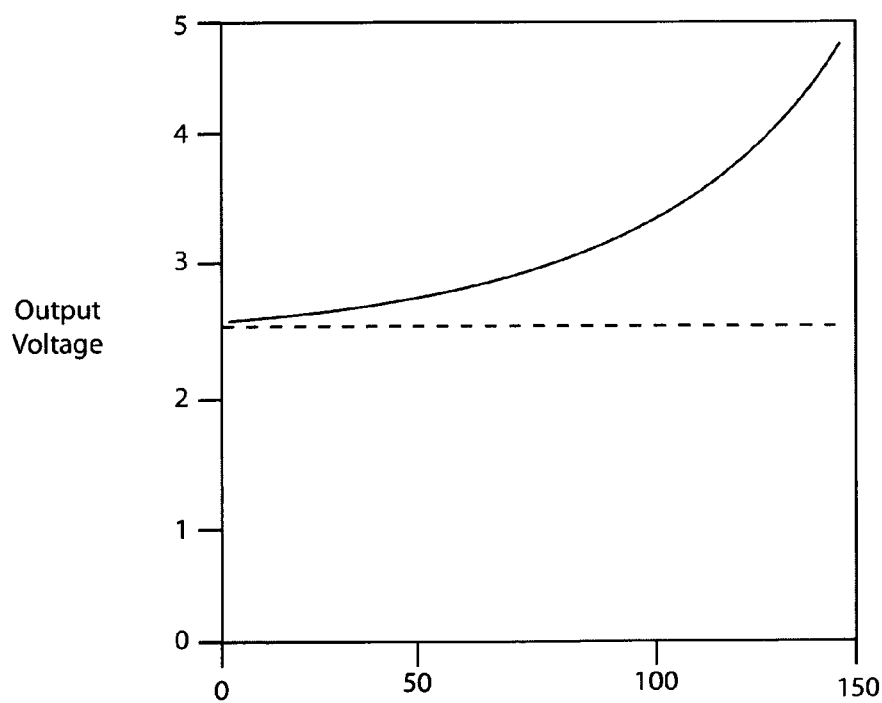
FIG. 11 is a chart showing Hall effect sensor output vs. applied differential pressure.

As previously mentioned, the IFI monitor 10 reads and interprets a differential pressure applied to its inputs and generates a suitable output corresponding to the applied differential pressure. A separate function also reads and interprets the temperature of the IFI monitor and generates a suitable output corresponding to the temperature. The differential pressure applied to the IFI monitor results in movement of the internal magnet 44 in the first internal chamber 20. The higher the pressure, the further the magnet 44 will move inside the first internal chamber 20. The electronic sensor 53 generates a voltage proportional to the proximity of the magnet 44 to the sensor. FIG. 11 shows the output of the Hall effect sensor 53 vs. differential pressure applied to the IFI monitor 10.

Figure 12:
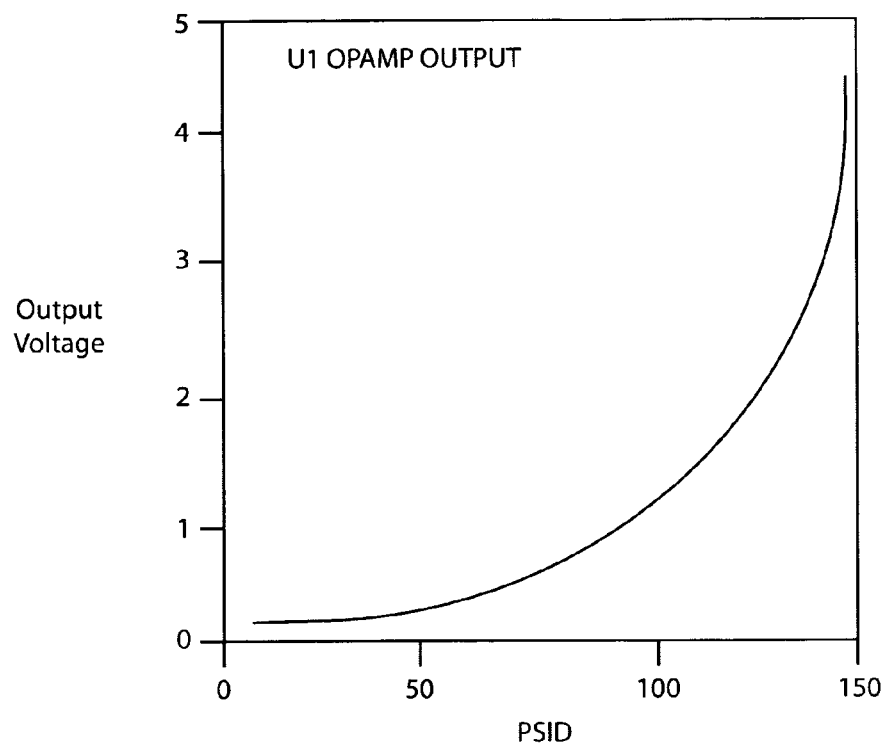
FIG. 12 is a chart showing Hall effect sensor output vs. pressure modified by opamp.

The range of the output voltage is limited to 2.5 and 5Vdc. order increase the range and provide additional accuracy and resolution of the measured differential pressure, an Opamp (U1) is utilized. The Opamp (U1) increases the range by subtracting 2.5V from the output of the Hall effect sensor 53 and multiplying the result by 2. The resulting curve is shown in FIG. 12.

Figure 9:
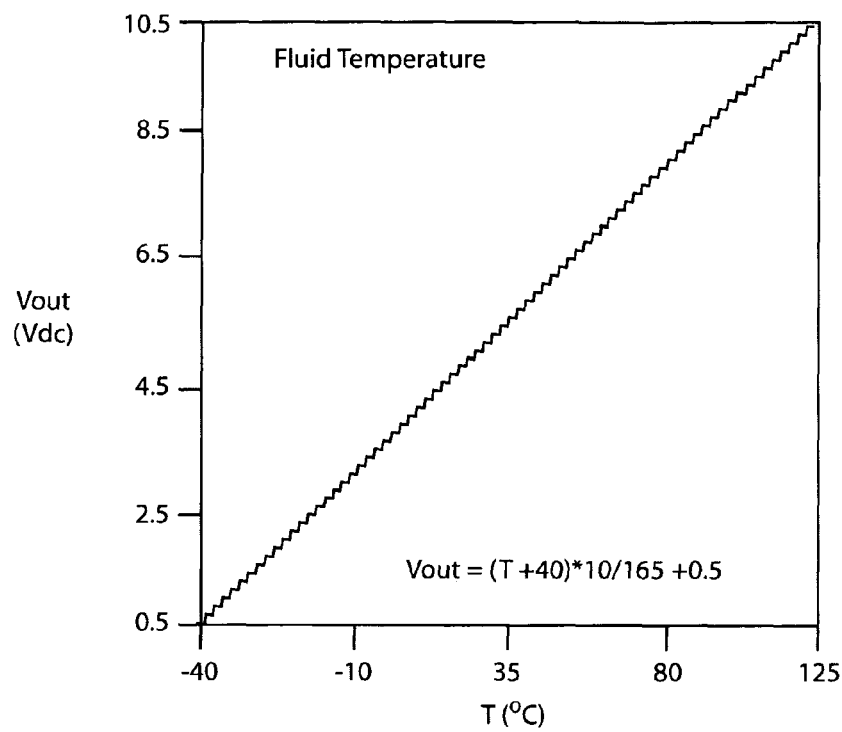
FIG. 9 is a chart showing conversion of the temperature output to a digital value and then to a voltage value.
Figure 10:
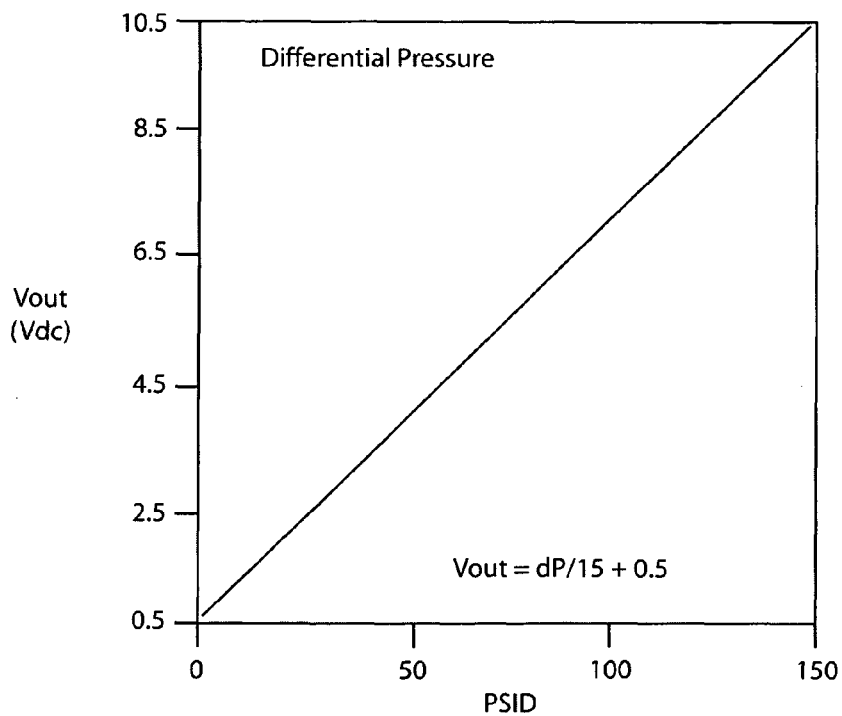
FIG. 10 is a chart showing output voltage code for differential pressure.

The microcontroller of the control board assembly is tasked with interpreting the outputs of the Opamp (U1) and the temperature sensor and generating suitable outputs for each. Both the temperature and opamp outputs are read and converted into digital format by the microcontroller before further processing. The analog to digital inputs of the microcontroller each employ 1024 steps to convert the inputs to digital format, i.e. a number between 0 and 1023 (ADC_output). (See FIGS. 9 and 10.) These outputs are then converted to a number between 0 and 5 Vdc using the following relationship:

$$Vdc = (5/1024)*ADC\_output \quad (1)$$

During the IFI calibration process, an internal table of values is generated which correspond to the output of the opamp vs. applied differential pressure. Each index value in the table corresponds to a fixed step of differential pressure. The firmware then proceeds to compare the voltage value obtained from (1) to the internal table of values and finds the lowest value that corresponds to the one calculated from formula (1) above. The pressure is then calculated as:

$$\text{Diff pressure} = (\text{Index number of table corresponding to the lowest value to fit the measurement})*(\text{table index step value}) \quad (2)$$

Once the value of the differential pressure is known, the microcontroller proceeds to generate the output code for this pressure value. Output codes are 0050 for zero pressure and 1050 for 150 PSID of pressure. The equation for the conversion is as follows:

$$\text{Pressure output code} = \text{Integer value of (Diff Pressure}/15) + 15) \quad (3)$$

The result is a linear output for the pressure channel obtained from a nonlinear output of the Hall effect sensor 53. The external monitor 64 used to read and decode the values sent from the IFI monitor 10 need to convert this code to a voltage by dividing the code by 100 to obtain the graph shown in FIG. 10.

Temperature Output:

The microcontroller has a separate table of values for temperature output stored in its memory. This table is fixed for the IFI monitor 10 and is a linear table of values with a step of 1 degree centigrade.

The procedure is the same as for the pressure channel. The output of the temperature is converted into a digital value between 0 and 1023 and then converted to a voltage value using formula (1) above. To find the corresponding temperature value, the external monitor 62 scans the temperature table to find the lowest entry that exceeds the input from the temperature sensor. It then uses the index value (1 degree C.) to find the actual temperature by using:

$$\text{Temp in degree C.} = \text{Index value} * 1 \text{ degree C.} \quad (4)$$

The temperature channel output is then converted to the required output using the following relationship:

$$\text{Temperature output Code} = (\text{Temperature in degree C.} + 40) * 1000/165 + 50$$

Code 0050 corresponds to −40° C. and code 1050 corresponds to 125° C. The external monitor 64 used to read and decode the values sent from the IFI monitor 10 need to convert this code to a voltage by dividing the code by 100 to obtain the graph shown in FIG. 9.

Output of the IFI monitor 10 is a digital signal conforming to EIA RS422 standard. The output consists two differential digital lines which swing between 0 and 5 Vdc and contain the codes for the differential pressure and temperature outputs. Output conversion from internal digital signals to signals in compliance with RS422 is accomplished by the differential line driver 57.

Input Voltage Regulator

The input voltage to the IFI monitor 10 is a dc signal between 18 and 32V (28 Vdc nominal). A switching regulator 69 converts this input voltage to a regulated 5 Vdc supply for internal use by the various components of the IFI monitor 10.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. In a filter monitoring device for detecting variances in pressure of flue flowing through a filter element in a filter assembly, said monitoring device including:
   (i) a member which is axially movable in response to changes in the differential pressure of the fluid in said filter assembly, the movement of said movable member being detected by a Hall effect sensor which generates voltage based upon the proximity of said movable member to said sensor,
   (ii) a first indicator means for conveying data of changes in said differential pressure, and
   (iii) temperature sensing means for measure or detecting any change in temperature of the fluid being filtered and for transmitting data showing any changes in temperature,
   the improvement comprising:
   an operational amplifier for receiving data from said first indicator, a microcontroller for receiving data (a) from said operational amplifier and (b) from said temperature sensing means, said microcontroller converting data received from said operational amplifier and said temperature sensing means to digital format, said microcontroller determining an output voltage code for differential pressure based upon voltage from said Hall effect sensor and an output voltage code for temperature based upon actual temperature of fluid flowing through said filter, said microcontroller transmitting said voltage codes along two differential digital lines to a drive and output connector.

2. The filter monitoring device improvement according to claim 1 wherein said two differential digital lines swing between 0 and 5Vdc.

3. The filtering monitoring device improvement according to claim 1 further including a voltage switching regulator for converting voltage from said output connector to 5Vdc.

4. The filtering monitoring device improvement according to claim 1 wherein said operational amplifier subtracts 2.5V from the output of said Hall sensor and multiplies the result by 2 and wherein the microcontroller receives the output from the operational amplifier and converts it to a number between 0 and 5V dc according to the formula $$Vdc = (5/1024 \times ADC \text{ output})$$

wherein ADC output is the voltage transmitted by said Hall sensor to said operational amplifier, and wherein said microcontroller further converts the output from said temperature sensing means to a voltage value and wherein said microcontroller has stored in its memory a linear table of values for temperature output with steps based upon degree centigrade of change in temperature output with steps based upon degree centigrade of change in temperature, said microcontroller converting the output of the temperature sensor from analog data into a digital value between 0 to 1023 and thereafter converted to a voltage value according to the formula:

$$Vdc = 5/1024 \times ADC \text{ output}$$

wherein ADC output is the analog data transmitted by said temperature sensor to said microcontroller.

5. A method for detecting variances in pressure of fluid flowing through a filter element in a filter assembly using a monitoring device having
   (i) a member which is axially movable in response to changes in the differential pressure of the fluid in said filter assembly, the movement of said movable member being detected by a Hall effect sensor which generates voltage based upon the proximity of said movable member to said sensor,
   (ii) temperature sensing means for measure or detecting any change in temperature of the fluid being filtered and for transmitting data showing any changes in temperature,
   said method comprising the steps of
   (a) providing an operational amplifier and a microcontroller, transmitting data from said first indicator means to said operational amplifier and thereafter to said microcontroller and from said temperature sensing means to said microcontroller (c) converting data received by said microcontroller from said operational amplifier and said temperature sensing means to digital format, by (I) determining an output voltage code for differential pressure based upon voltage from said Hall effect sensor and an output voltage code for temperature based upon actual temperature of fluid flowing through said filter, and (II) transmitting said voltage codes along two differential digital lines to a driver and output connector.

6. The method of claim 5 further including the step of causing said two differential digital lines which swing between 0 and 5Vdc.

7. The method of claim 5 further including the step of providing voltage switching regulator for converting voltage from said output connector to 5Vdc.

8. The method of claim 5 further including the step of causing said operational amplifier to subtract 2.5V from the output of said Hall sensor and multiply the result by 2, transmitting the output of said operational amplifier to said microprocessor; converting said output to a number between 0 and 5Vc according to the formula:

$$Vdc = 5/1024 \times ADC\ output$$

wherein ADC output is the voltage transmitted by said Hall sensor to said operational amplifier;

converting the output of the temperature sensor to said microcontroller from analog data into a digital value between 0 to 1023 and thereafter converting said digital value to a voltage value according to the formula:

$$Vdc = 5/1024 \times ADC\ output$$

wherein ADC output is the analog data transmitted by said temperature sensor to said microcontroller.

9. A method for receiving at a monitor information of variances in pressure and temperature of fluid flowing through a filter element in a filter assembly and transmitting data relating to said information from said monitor to an external monitor apparatus comprising the steps of:
   (a) providing a filter monitor for receiving said information;
   (b) connecting a first signal wire between said filter monitor and said external monitor;
   (c) connecting a second signal wire between said filter monitor and said external monitor;
   (d) transmitting signals representing data received by said filter monitor through said first and second signal wires to said external monitor at voltages varying between 0 Vdc and 5 Vdc such that when the signal through the first signal wire is 0 Vdc, the signal through the second signal wire is 5 Vdc; and
   (e) causing said external monitor to convert said signals received from said first and second signal wires to a single signal swinging between 0 Vdc and 5 Vdc.

10. The method according to claim 9 wherein each of said first and second signal wires two bytes of data, one of said bytes representing temperature and the other of said bytes representing differential pressure as measured by said filter monitor.

11. The method according to claim 10 wherein the number of bytes of data transmitted by said filter monitor is four and further including the steps of preceding each byte with a START bit and ending each byte with a STOP byte.

12. The method according to claim 11 further including the steps of setting a PARITY bit to "1" if the total number of "1s" in each byte transmitted is odd and setting said PARITY bit to "0" if the total number of "1s" in each byte is even and sending said PARITY bit prior to sending said STOP bit.

13. The method according to claim 12 further including the step of causing said external monitor to check said PARITY bit to determine whether or not it has received a valid byte.

14. The method according to claim 10 further including the step of transferring said bytes at a rate of 9600 bits per second.

15. A method for receiving data relating to (1) pressure differential and (2) temperature of a liquid in analog format and converting it to digital format for transmission to a monitor comprising the steps of:
   (a) sensing movement of a magnet toward a Hall effect sensor in response to pressure differential;
   (b) transmitting to a microcontroller a first voltage based upon said sensed pressure differential, said first voltage being in the range of 2.5 to 5Vdc;
   (c) transmitting to said microcontroller a second voltage based upon temperature of said liquid, said second voltage being in the range of 2.5 to 5Vdc;
   (d) converting at said microcontroller said first and second voltages to pressure data in digital form and to temperature data in digital form, respectively;
   (e) transmitting pressure differential data and temperature data from said microcontroller via a first signal wire at voltages swinging between 5Vdc and 0Vdc and via a second signal wire at voltages swinging between 0Vdc and 5Vdc with the voltages transmitted by the respective first and second signal wires being mirror images of one another.

16. The method according to claim 15 further including the steps of
   (f) causing said pressure differential data and said temperature data to include 4 bytes of 8 bits each representing pressure differential and 4 bytes of 8 bits each representing temperature with each byte having two binary coded decimals (BCDs) in numeric form;
   (g) transmitting 4 BCD numbers representing temperature in two bytes, namely bytes 1 and 2;
   (h) thereafter transmitting 4 BCD numbers representing pressure differential namely, bytes 3 and 4;
   (i) combining bytes 1 and 2 for temperature in the order received and divide by 100 to obtain a first numeric value;
   (j) combining bytes 3 and 4 for pressure differential in the order received and divide by 100 to obtain a second numeric value;
   (k) calculating actual temperature in degree Celsius according to the formula $T = (TVdc - 400/165 - 0.5) \times 16.5$ where TVdc is said first numeric value;
   (l) calculating actual pressure in PSID according to the formula $dp = (dPVdc - 0.5) \times 15$ where dPVdc is said second numeric value.

17. A method for detecting variances in pressure and detecting the temperature of fluid flowing through a filter element in a liquid flow system comprising the steps of
   (a) sensing movement of a magnet toward a Hall effect sensor in response to pressure differential of said liquid;
   (b) transmitting to a microcontroller a first voltage based upon said sensed pressure differential, said first voltage being in the range of 2.5 to 5Vdc;
   (c) transmitting to a microcontroller a second voltage based upon temperature of said liquid, said second voltage being in the range of 2.5 to 5Vdc;
   (d) converting at said microcontroller said first and second voltages to pressure data in digital form and to temperature data in digital form, respectively;
   (e) transmitting pressure differential data and temperature data from said microcontroller via a first signal wire at voltages swinging between 5Vdc and 0Vdc and via a second signal wire at voltages swinging between 0Vdc and 5Vdc with the voltages transmitted by the respective first and second signal wires being mirror images of one another;
   (f) causing said pressure differential data and said temperature data to include 4 bytes of 8 bits each representing pressure differential and 4 bytes of 8 bits each representing temperature with each byte having two binary coded decimals (BCDs) in numeric form;

(g) transmitting 4 BCD numbers representing temperature in two bytes, namely bytes 1 and 2;
(h) thereafter transmitting 4 BCD numbers representing pressure differential namely, bytes 3 and 4;
(i) combining bytes 1 and 2 for temperature in the order received and divide by 100 to obtain a first numeric value;
(j) combining bytes 3 and 4 for pressure differential in the order received and divide by 100 to obtain a second numeric value;
(k) calculating actual temperature in degrees Celsius according to the formula $T=(TVdc-400/165-0.5)\times 16.5$ where TVdc is said first numeric value; and
(l) calculating actual pressure in PSID according to the formula $dp=(dPVdc-0.5)\times 15$ where dPVdc is said second numeric value.

* * * * *